(12) United States Patent
Balachandran et al.

(10) Patent No.: US 7,194,000 B2
(45) Date of Patent: Mar. 20, 2007

(54) METHODS AND SYSTEMS FOR PROVISION OF STREAMING DATA SERVICES IN AN INTERNET PROTOCOL NETWORK

(75) Inventors: Kumar Balachandran, Cary, NC (US); Rajaram Ramesh, Cary, NC (US)

(73) Assignee: Telefonaktiebolaget L.M. Ericsson (SE)

( * ) Notice: Subject to any disclaimer, the term of this patent is extended or adjusted under 35 U.S.C. 154(b) by 1026 days.

(21) Appl. No.: 10/177,205

(22) Filed: Jun. 21, 2002

(65) Prior Publication Data

US 2003/0235196 A1 Dec. 25, 2003

(51) Int. Cl.
*H04J 3/16* (2006.01)
*H04L 12/28* (2006.01)
*H04N 7/12* (2006.01)

(52) U.S. Cl. ............ 370/395.42; 370/468; 370/395.21; 375/240.02; 375/240.11

(58) Field of Classification Search .............. 370/395.2, 370/395.4, 395.42, 352, 468, 400, 401, 351, 370/235, 236, 230, 396
See application file for complete search history.

(56) References Cited

U.S. PATENT DOCUMENTS

| | | | |
|---|---|---|---|
| 6,918,077 B2 * | 7/2005 | Fukushima et al. | 714/748 |
| 6,937,566 B1 * | 8/2005 | Forslow | 370/231 |
| 6,944,166 B1 * | 9/2005 | Perinpanathan et al. | 370/401 |
| 7,006,472 B1 * | 2/2006 | Immonen et al. | 370/332 |
| 7,050,445 B1 * | 5/2006 | Zellner et al. | 370/412 |

OTHER PUBLICATIONS

*RLC with Limited Retransmissions for Streaming Service Class.* 3GPP TSG GERAN #2, Nov. 6-10, 2000, pp. 1-11.
*On the Application of 'Limited Retransmission' for the Realisation of a Streaming Bearer.* 3GPP GERAN Ad #4, Feb. 12-16, 2001.
*RLC with Limited Retransmissions for Streaming Service Class.* 3GPP TSG GERAN #3, Jan. 15-19, 2001.
*Performance Comparison between Limited and Unlimited Retransmission for Streaming.* 3 GPP TSG GERAN #3, Jan. 15-19, 2000, pp. 1-5.
*3rd Generation Partnership Project; Technical Specification Group Services and System Aspects; Transparent end-to-end packet switched streaming service (PSS); General description (Release 4).* 3GPP TS 26.233 V4.2.0, Mar. 2002.

(Continued)

*Primary Examiner*—Hanh Nguyen
(74) *Attorney, Agent, or Firm*—Myers Bigel Sibley & Sajovec

(57) ABSTRACT

Control of the transmission of streaming data between a first data processing system and a second data processing system in a packet network is provided. Priorities are assigned to packets of the streaming data based on characteristics of the packets of streaming data. Performance of transmission of the packets from the first data processing system to the second data processing system is monitored and retransmission of selected ones of the packets from the first data processing system to the second data processing system is terminated based on the assigned priority of the selected ones of the packets and the monitored performance of transmission. The streaming data may be progressively encoded. Furthermore, the priorities assigned to the packets of streaming data may be based on the level of progressive coding associated with a packet of data.

39 Claims, 7 Drawing Sheets

OTHER PUBLICATIONS

3rd Generation Partnership Project; Technical Specification Group Radio Access Network; RLC Protocol Specification (Release 1999). 3G TS 25.322 V3.3.0, Jun. 2000.

3rd Generation Partnership Project; Technical Specification Group Radio Access Network; RLC Protocol Specification (Release 1999). 3GPP TS 25.322 V3.6.0, Mar. 2001.

3rd Generation Partnership Project; Technical Specification Group Services and System Aspects; General Packet Radio Service (GPRS); Service Description; Stage 2 (Release 1999).

Chang et al. Abstract: *Adapting Network Video to Multi-Time Scale Bandwidth Fluctuations*. 2000 IEEE International Conference on Multimedia and Expo. ICME2000. Proceedings. Latest Advances in the Fast Changing World of Multimedia (Cat. No. 00TH8532, 2000, vol. 2, pp. 999-1002.

Chang et al. Abstract: *Multimedia CDMA Wireless Network Design: the Link Layer Perspective*. 1999 IEEE International Conference on Communications (Cat. No. 99CH36311). 1999. vol. 3, pp. 1421-1425.

Chang et al. Abstract: *Effects of Temporal Jitter on Video Quality: Assessment Using Psychophysical and ComputationalModeling Methods*. Proceedings of the SPIE, The International Society for Optical Engineering. 1998, vol. 3299, pp. 173-179.

Chang et al. Abstract: *Segmentation and Compression of Video for Delay-Flow Multimedia Networks*. Proceedings of the 1998 IEEE International Conference on Acoustics, Speech and Signal Processing (ICASSP '98, Cat. No. 98CH36181). 1998, vol. 5, pp. 2985-2988.

Yun et al. Abstract: *Digital Video in a Fading Interface Wireless Environment*. 1996 International Conference on Acoustics, Speech, and Signal Processing Conference Proceedings (Cat. No. 96CH35903), 1996, vol. 2, pp. 1069-1072.

Messerschmitt et al. Abstract: *The Convergence of Telecommunications and Computing: What are the Implications Today?* Proceedings of the IEEE. Aug. 1996, vol. 84, No. 8, pp. 1167-1186.

Messerschmitt et al. Abstract: *The Future of Computer Telecommunications Integration*. IEEE Communications Magazine. Apr. 1996, 34, No. 4, pp. 66-69.

Soderstrand et al. Abstract: *Minimum Denominator Multiplier Pipelined Recursive Digital Filters*. IEEE Transactions on Circuits and Systems II: Analog and Digital Signal Processing. Oct. 1995, vol. 42, No. 10, pp. 666-672.

Kahn et al. Abstract: *High-Speed Non-DirectionalInfrared Communication for Wireless Local-Area Networks*. Conference Record of The Twenty-Sixth Asilomar Conference on Signals, Systems, and Computers (Cat. No. 92CJ3245-8). 1992, vol. 1, pp. 83-87.

Chang et al. Abstract: *Adaptive Bandwidth Balancing on DQDB Networks*. SUPERCOMM/ICC '92 Discovering a New World of Communications (Cat. No. 92CH3132-8), 1992, vol. 2, pp. 1092-1096.

Kahn et al. Abstract: *Design of High-Speed Wireless Links Using Non-Directional Infrared Radiation*, Wireless Communications. Future Directions. 1993, pp. 109-126.

Li et al. Abstract: *Channel Capacity Optimization of Chirp-Limited Dense WDM/WDMA Systems Using OOK/FSK Modulation and Optical Filters*, Journal of Lightwave Technology. Aug. 1992, vol. 10, No. 8, pp. 1148-1161.

Lin et al. Abstract: *Designing a High-Throughput VLC Decoder I. Parallel Decoding Methods*, IEEE Transactions on Circuits and Systems for Video Technology, Jun. 1992, vol. 2, No. 2, pp. 197-206.

Chang et al. Abstract: *Adaptable-Bit-Rate Video Services on DQDB Access Networks*ICC '91, International Conference on Communications Conference Record (Cat. No. 91CH2984-3). 1991, vol. 2, pp. 836-841.

Barry et al. Abstract: *High-Speed Nondirective Optical Communication for Wireless Networks*, IEEE-Network. Nov. 1991, vol. 5, No. 6, pp. 44-54.

Sih et al. Abstract: *An Overview of HDTV and Its Implications for the Broadband ISDN*. Conference Record, Twenty-Third Asilomar Conference on Signals, Systems and Computers (IEEE Cat. No. 89-CH2836-5), 1989, vol. 2, pp. 883-887.

Lin et al. Abstract: *High Throughput Reconstruction of Huffman-Coded Images*. Proceedings, 1989 IEEE International Conference on Computer Design: VLSI in Computers and Processors (Cat. No. 89CH2794-6). pp. 172-5.

Seidel et al. Abstract: *Capacitive Silicon Acclerometer with Highly Symmetrical Design*. Sensors and Acutators A (Physical). Feb. 1990, vol. a21, No. 1-3, pp. 312-315.

Koniger. Abstract: *Sensors for Space Applications*. Proceedings, VLSI and Computer Peripherals, VLSI and Microelectric Applications in Intelligent Peripherals and their Interconnection Networks (Cat. No. 89CH2704-5). 1989, pp. 3/68-73.

International Search Report for corresponding application No. PCT/US03/16458 dated Oct. 14, 2003.

Miyazaki et al. "TRP Payload Formats to Enable multiple Selective Retransmissions," IETF Audio/Video Transport Working Group. May 2002.

Regaie et al. "Quality Adaptation for Congestion Controlled Video Playback Over the Internet," SIGCOMM. Feb. 15, 1999, pp. 189-200.

King et al. "Low Bit Rate Scalable Video Coding with 3-D Set Partitioning in Hierarchical Tress," IEEE Transactions on Circuits and Systems for Video Technology. vol. 10, No. 8, Dec. 2000, pp. 1374-1387.

Bruhn et al. "Concepts and Solutions for Link Adaptation and Inband Signaling for the GSM AMR Speech Coding Standard," IEEE VTC, vol. 3. May 16-20, 1999, pp. 2451-2455.

\* cited by examiner

METHODS AND SYSTEMS FOR PROVISION OF STREAMING DATA SERVICES IN AN INTERNET PROTOCOL NETWORK

BACKGROUND OF THE INVENTION

The present invention relates to the field of communications in general and more particularly to Internet Protocol (IP) networks.

The Internet has grown tremendously in the past decade and may overtake traditional telecommunication networks for carrying information. On wired networks, it is possible to make telephone calls using Voice over IP (Vow) technology. Furthermore, the Internet allows access to a variety of other multimedia services such as web access. The proliferation of the Internet and wireless technology has led to a merging of the two.

The Global System for Mobile (GSM) Communication cellular standard was developed to evolve older analog standards such as the Nordic Mobile Telephone (NMT) system to modem spectrally efficient technologies based on digital communications. Over time the GSM system has evolved to support packet radio as well through the General Packet Radio Service (GPRS) network. Further improvement in spectral efficiency has been planned through introduction of the effort named, Enhanced Data rates for Global Evolution (EDGE) of TDMA standards.

The Universal Terrestrial Mobile Telephone System (UMTS) is an evolution of traditional telecommunication networks to support a service-centric architecture. The UMTS system has evolved to support circuit switched and packet switched communication within a single network managed by clearly defined modular components and interfaces. The network may allow easy replacement or improvement of functionality without affecting other components, and aims at providing uniform access to traditional and multimedia services using a variety of access methodologies. Although the UMTS system was developed around the Wideband Code Division Multiple Access (WCDMA) air-interface as defined by the UMTS Terrestrial Radio Access Network (UTRAN), the GSM/EDGE standardization effort has resulted in the GSM/EDGE Radio Access Network (GERAN) being considered as an alternative access network to the UMTS Core Network. Further evolution of the UMTS core network concentrates on developing the all-IP network, aiming at support of end-to-end multimedia services over all attached radio access networks.

Although audio codecs and video codecs are, typically, capable of adapting their source rates, that rate change will, typically, occur over a much longer time frame than needed to follow the effects of environmental changes on the communications channel.

SUMMARY OF THE INVENTION

Embodiments of the present invention provide methods and systems for controlling the transmission of streaming data transmitted from a first data processing system to a second data processing system by controlling the transmission of data packets of the streaming data from the first data processing system to the second data processing system based on a level of information content associated with corresponding ones of the data packets so that data packets with a higher level of information content are given priority in transmission over data packets with a lower level of information content.

In further embodiments of the present invention, priorities are assigned to packets of the streaming data based on characteristics of the packets of streaming data. Performance of transmission of the packets from the first data processing system to the second data processing system is monitored and retransmission of selected ones of the packets from the first data processing system to the second data processing system terminated based on the assigned priority of the selected ones of the packets and the monitored performance of transmission. The streaming data may be progressively encoded. Furthermore, the priorities assigned to the packets of streaming data may be based on the level of progressive coding associated with a packet of data.

In additional embodiments of the present invention where the communications media is a wireless channel, the transmission of packets of streaming data transmitted from a base station to a mobile terminal of a radio access network over the wireless communications channel is controlled by classifying packets of streaming data based on the data content of the packets so as to provide a priority associated with each packet of streaming data received by the base station for transmission from the base station to the mobile terminal. Packets of streaming data are discarded based on the priorities associated with the packets and a characteristic of the transmission of packets of streaming data to the mobile terminal. Furthermore, retransmission of the packets of streaming data may be controlled based on the priorities assigned to the packets such that packets with a higher priority are retransmitted more often than packets of lower priority. In particular embodiments of the present invention, the control of the transmission of packets may be provided where the packets of streaming data are received by the base station from a core network of a Universal Terrestrial Mobile Telephone System (UMTS).

DETAILED DESCRIPTION OF THE INVENTION

Figure 1:
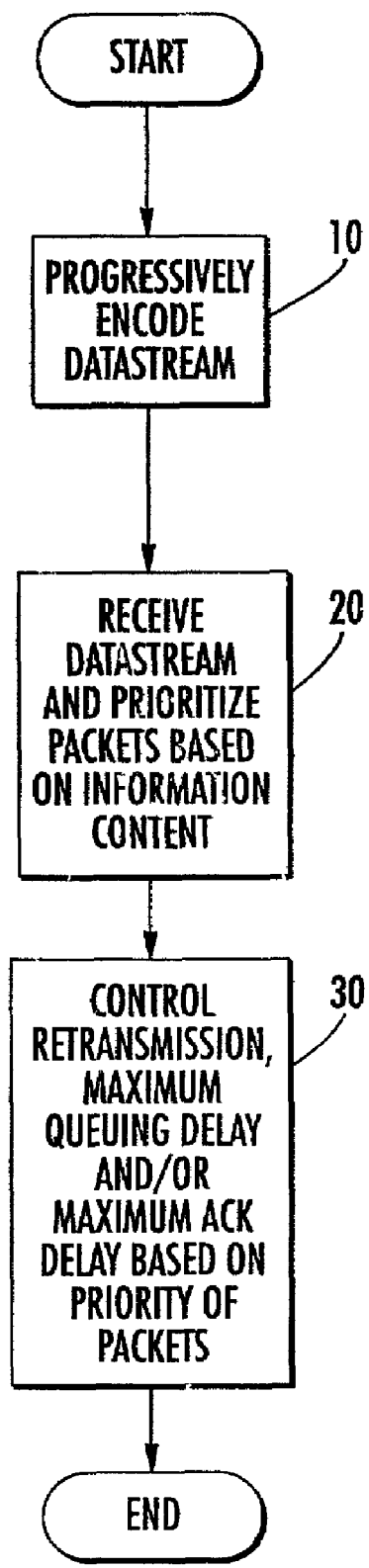
FIG. 1 is a flowchart illustrating operations according to embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects, all generally referred to herein as a "circuit." Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on a single computer and/or data processing system, partly on a first computer and/or data processing system, as a stand-alone software package or as part of another software package, partly on a first computer and/or data processing system and partly on one or more remote computers and/or data processing systems or entirely on one or more remote computers and/or data processing systems. The remote computer(s) may be connected to the first computer directly, through a local area network (LAN), a wide area network (WAN), a wireless communication media, a wired communication media or other such internetworking media, or the connection may be made through one or more external computers and/or data processing systems (for example, through the Internet using an Internet Service Provider or through a packet switched or circuit switched network, such as a telephony network).

The present invention is described below with reference to flowchart illustrations and/or block and/or flow diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block and/or flow diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

In embodiments of the present invention packets or Service Data Units (SDUs), may be discarded based on the information content of the packets. Thus, for example, in a wireless embodiment of the present invention, radio bearers and/or radio access bearers with high priority will be subject to discard only after discarding low priority radio bearers and/or radio access bearers. Furthermore, retransmission may be controlled so that higher priority packets are retransmitted more often, while low priority packets are retransmitted less often, or not at all. This procedure may allow reasonable tradeoff between delay and perceptual quality of the reconstructed media.

While embodiments of the present invention are described below primarily with reference to the GERAN, the teachings of the present invention may be applicable to other wireless networks such as other components of the UMTS network, or to other standards such as the cdma2000 standard being developed within the 3 G.PP2 forum. Furthermore, the invention may be equally applicable to wireline telecommunications networks such as those being defined around broadband access technologies. Thus, the present invention should not be construed as limited to the GERAN embodiments described herein. Similarly, while embodiments of the present invention are described herein with reference to particular circuits, architectures, block diagrams and the like, the present invention should not be construed as limited to such configurations but may be provided by any system, architecture and/or circuit capable of carrying out the operations described herein.

Embodiments of the present invention provide control of streaming data services over a packet network. FIG. 1 illustrates operations according to embodiments of the present invention. As seen in FIG. 1, a datastream may, optionally, be progressively encoded such that packets of the datastream contain differing levels of information content (block 10). As described below, such progressive coding of data may be provided by, for example, subband and/or wavelet coding of the datastream. In any event, the packets of the datastream are evaluated to determine characteristics of the packets, such as the level of information content associated with the packet, and are prioritized based on this evaluation (block 20). Retransmission, a maximum queuing delay and/or a maximum delay for and ACK associated with the packets is controlled based on the priority associated with a packet (block 30). Thus, for example, packets with less information content may be retransmitted less often and/or fewer times, including not at all, than packets with higher information content. Similarly, packets with less information content may be discarded sooner than packets with higher information content.

Figure 2:
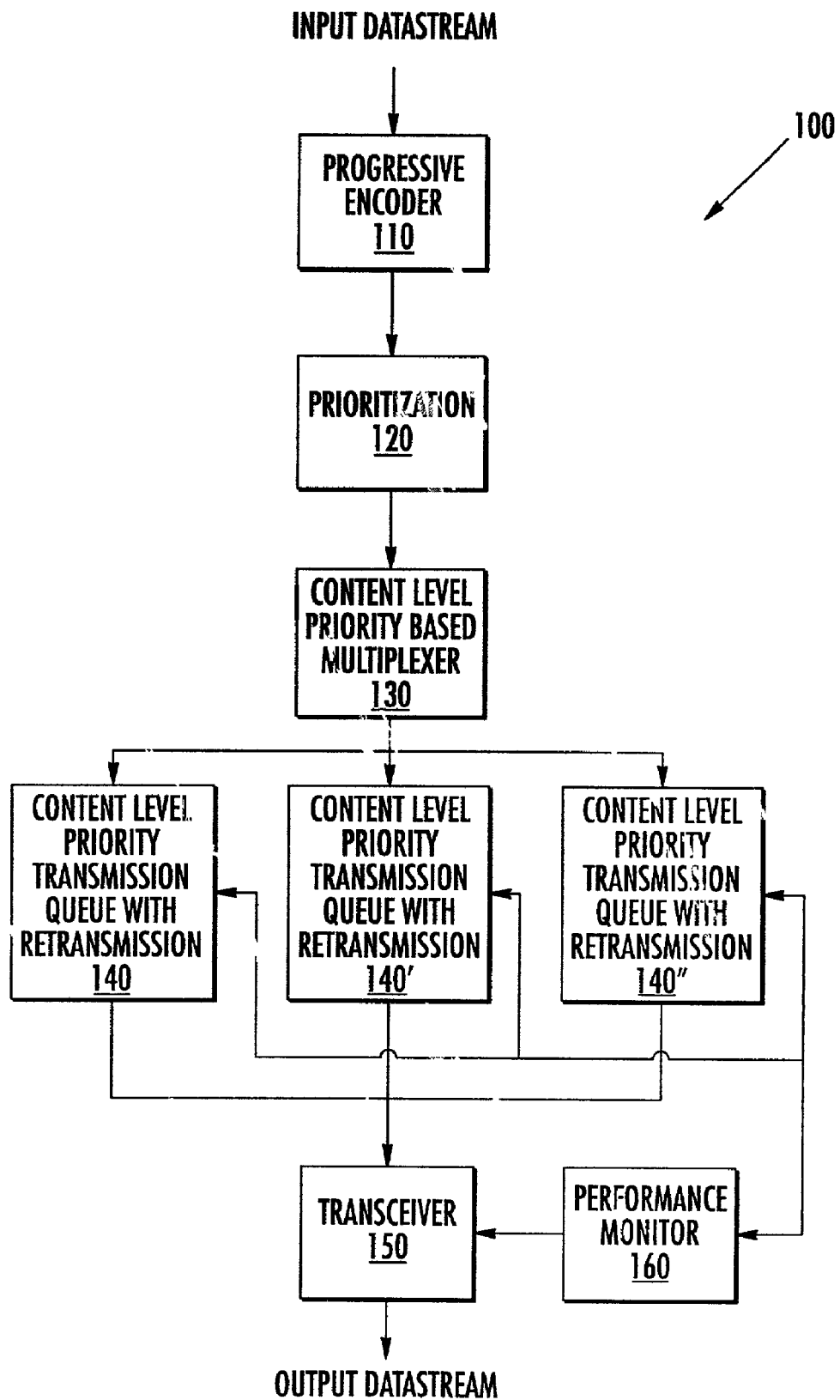
FIG. 2 is a block diagram of a system for providing streaming data services according to embodiments of the present invention.

FIG. 2 illustrates a system 100 according to embodiments of the present invention that provides control of an output datastream to be transmitted to an IP network. As seen in FIG. 2, an input datastream is provided to an optional progressive encoder 110. The progressive encoder 110 receives the input datastream and progressively encodes the data to provide a plurality of service data units (SDUs) containing one or more packets of data. The data may be progressively encoded by, for example, wavelet encoding and/or subband coding of the input datastream.

The packets of data from the progressive encoder 110 are provided to a level of content priority circuit 120 that assigns priorities to the packets of data based upon the level of information content of the data packets and provides the data packets and their associated priority to a level of content priority based multiplexer 130. The assignment of priority to a data packet may, for example, be based on the level of coding of the data packet. By assigning priorities to data packets based on the level of information content of the data packets, the transmission of the data packets may be controlled such that data packets with higher information content also have a higher likelihood of being received by a receiving device in a timely manner.

The level of content priority based multiplexer 130 places the packets of data on a transmission queue 140, 140' and 140" corresponding to the priority of the packet. The transmission queues 140, 140' and 140" also have the ability to selectively retransmit data packets that are not acknowledged and/or not acknowledged within a predetermined time by a receiving device. The different transmission queues 140, 140' and 140" may have different values associated with performance measurements of the transmission of the data packets in the queue. For example, a transmission queue with a corresponding high priority may have a maximum number of retransmission attempts associated with the data packets in the queue that is greater than the maximum number of retransmission attempts in a lower priority queue. Similarly, a higher priority queue may have a maximum packet transmission delay that is greater than a maximum packet transmission delay of a lower priority queue. The data packets from the transmission queues 140, 140' and 140" are provided to a transceiver 150 for transmission.

As is further illustrated in FIG. 1, a performance monitor 160 tracks the transmission of data by the transceiver and controls the output of the transmission queues 140, 140' and 140" based on monitored performance so as to give a higher transmission priority to data from higher priority transmission queues, for example, in the event of a high packet loss transmission medium, such as a low quality wireless connection. The performance monitor 160 may monitor characteristics such as queuing delays, retransmission attempts, acknowledgments and/or the like so as to discard packets that have not been transmitted, discard packets that have not been acknowledged as received and/or terminate retransmission of packets so as to increase the likelihood that high priority packets will be received by a receiving device. Furthermore, the circumstances under which action is taken by the performance monitor 160 may differ based on the priority associated with a particular transmission queue 140, 140' and/or 140". For example, an acceptable queuing delay or number of retransmission attempts for a high priority queue may be an unacceptable queuing delay or number of retransmission attempts for a lower priority queue.

As discussed above with reference to the progressive encoder 110, particular types of media compression may allow progressive compaction of source data. For example, subband coding techniques and wavelet transforms could be used to encode images at a variety of progressively increasing rates. Similar techniques exist for audio streams. For example, different classes of source data could be sent as components of different contributing sources in a single Routing Transport Protocol (RTP)/User Datagram Protocol (UDP)/Internet Protocol (IP) stream. An encoding type negotiated during session initiation can ensure that the streams are processed properly at the receiving device. Alternatively, the packets could be sent on different RTP/UDP/IP protocol stacks, with priority being set up by RSVP or DiffServ. For example, in wireless embodiments of the present invention, these progressive coding types may be used in combination with techniques that allow the use of different radio bearers for each incremental increase in data rate. Thus, for example, low bandwidth data can be encoded at lower rates than information at higher bandwidths. Encoding different classes of bits is already done in speech codecs, such as those that use the Adaptive Code Excited Linear Predictive (ACELP) algorithms; however, the low priority information in these codecs, typically, cannot be discarded completely. Thus, the ability to control packet transmission based on the encoding of the different classes of bits may be difficult.

Figure 3A:
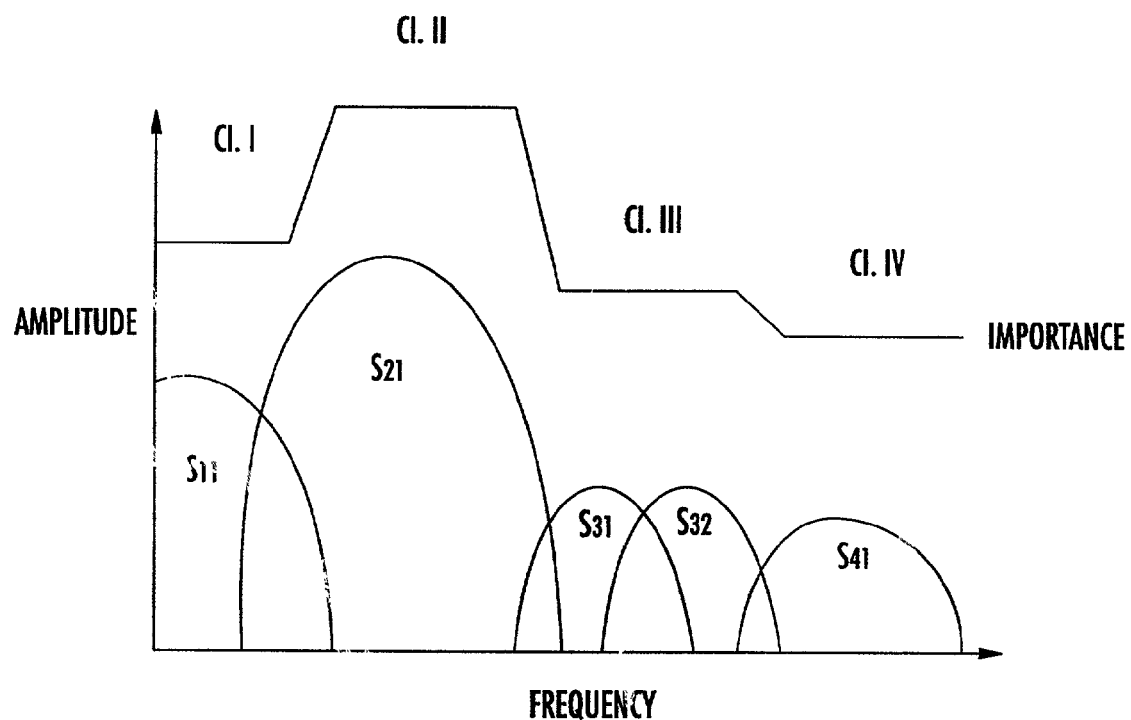
FIGS. 3A and 3B are diagrams illustrating an example of progressive coding.
Figure 3B:
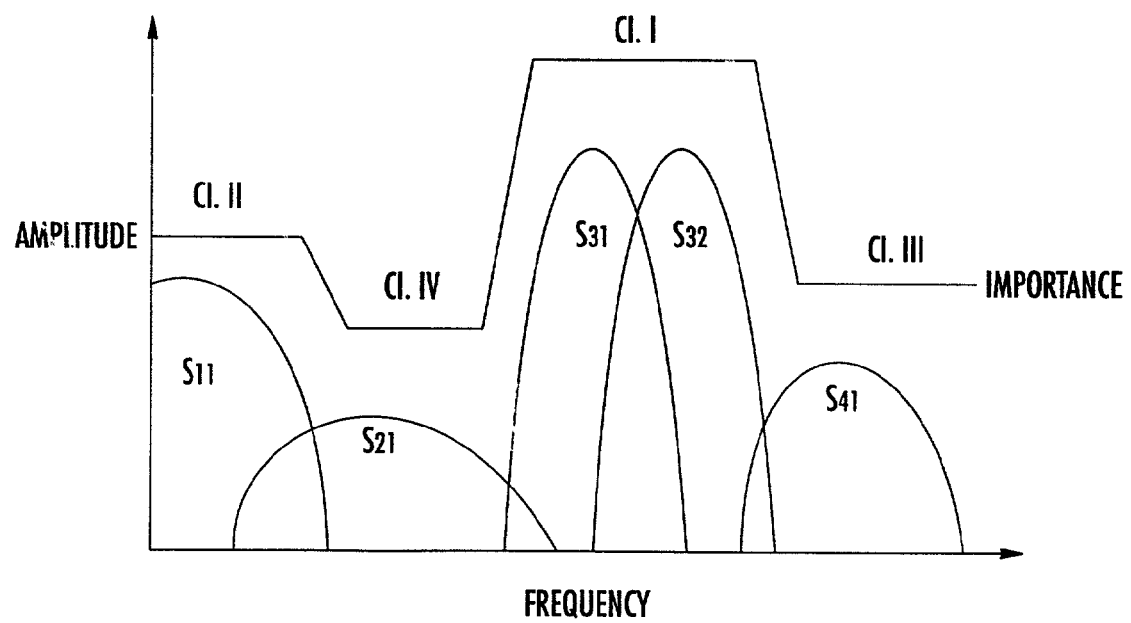

As discussed above, embodiments of the present invention may include progressively coding streaming data such that different packets of data have a different level of information content. Packets are then prioritized based on the level of content associated with the packets. Such a progressive coding of data and prioritization may be provided by subband coding as illustrated in FIGS. 3A and 3B. As seen in FIGS. 3A and 3B, a source coder classifies the importance of information in snapshots of coding blocks. In this example, 4 RTP flows have been established for prioritisation of the streaming data. These classes are divided as sub-band $S_{11}$, $S_{21}$, $S_{31}$, $S_{32}$ and $S_{41}$ in FIGS. 3A and 3B. Note that two sub-bands, $S_{31}$ and $S_{32}$ are combined into one of the priority classes, Class III in FIG. 3A and Class I in FIG. 3B.

The source priorities are changed per snapshot of source state and appropriately assigned to the appropriate RTP session or flow. Thus, in FIG. 3A, $S_{11}$ packets are routed to the RTP flow associated with Class I and in FIG. 3B, $S_{31}$ and $S_{32}$ packets are routed to the RTP flow associated with Class I. Similarly, in FIG. 3A, $S_{21}$ packets are routed to the RTP flow associated with Class II and in FIG. 3B, $S_{11}$ packets are routed to the RTP flow associated with Class II. In FIG. 3A, $S_{31}$ and $S_{32}$ packets are routed to the RTP flow associated with Class III and in FIG. 3B, $S_{41}$ packets are routed to the RTP flow associated with Class III. Finally, in FIG. 3A, $S_{41}$ packets are routed to the RTP flow associated with Class IV and in FIG. 3B, $S_{21}$ packets are routed to the RTP flow associated with Class IV. Thus, the packets are classified (e.g. priorities assigned to the packets of the snapshot) based on information content per snapshot and provided to the corresponding RTP flows based on such classification.

Embodiments of the present invention will now be described with reference to a third generation system, such as a UMTS based system 200 illustrated in FIG. 4. More detail on the operations of a UMTS may be found in the proposed specification documents from 3gpp.org, the disclosures of which are incorporated herein by reference as if set forth fully herein. For example, 3GPP TS 23.060 entitled "$3^{rd}$ Generation Partnership Project; Technical Specification Group Services and System Aspects; General Packet Radio Services (GPRS); Service Description; Stage 2" (Release 1999) provides a general overview of a UMTS and its operation and is incorporated herein as if set forth fully herein.

Figure 4:
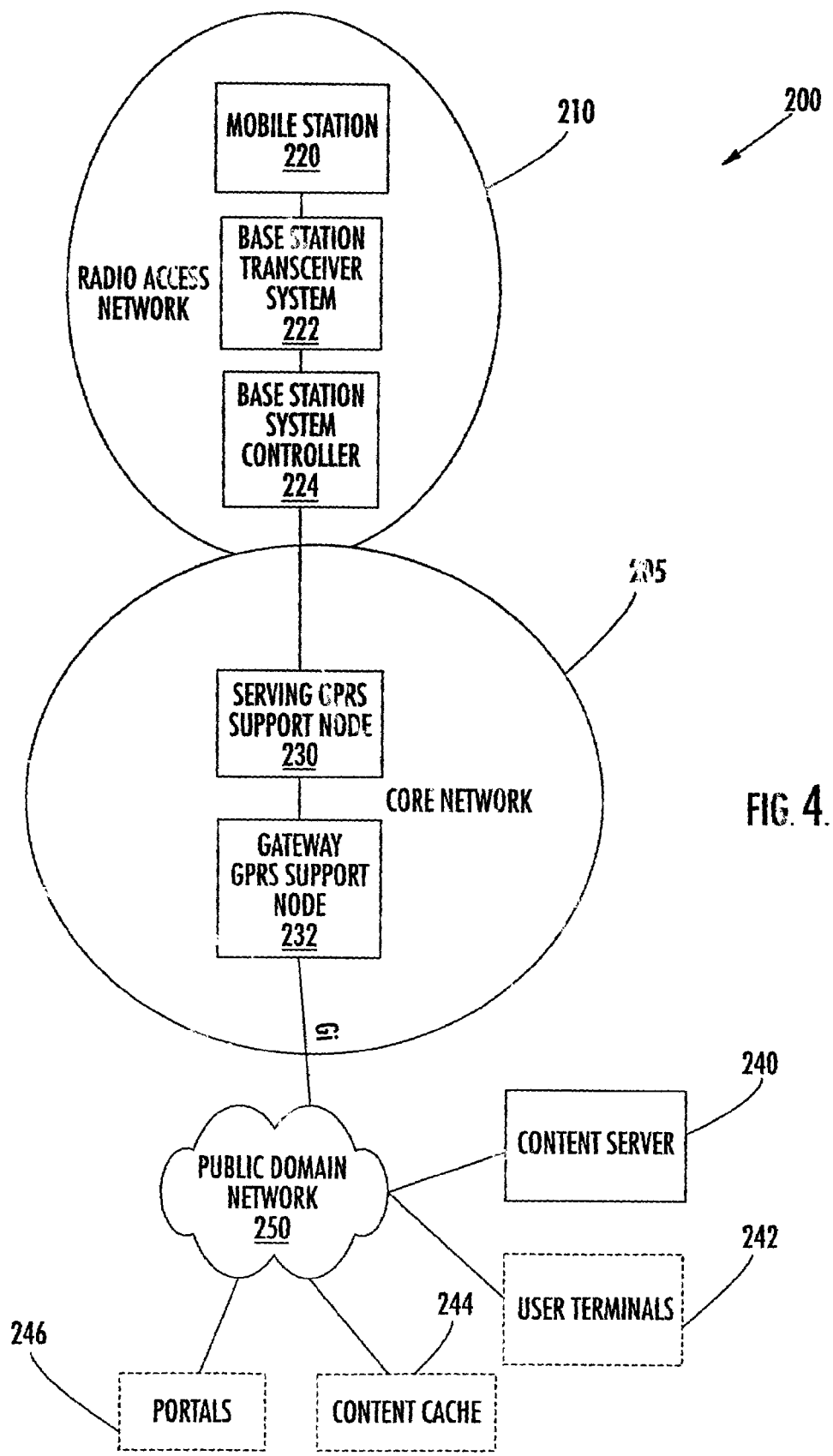
FIG. 4 is a block diagram of a UMTS system for providing streaming data services according to embodiments of the present invention.

As illustrated in FIG. 4, a core network 205 communicates with a radio network 210 and a public domain network 250. The public domain network may be, for example, the Internet, an intranet, a local area network (LAN) and/or a wide area network (WAN). The core network 205 may, for example, include a serving GPRS support node 230, a gateway GPRS support node 232 that is accessed over a Gi interface. The public domain network 250 may provide access for a content server 240 that provides streaming data. Also illustrated in FIG. 4 as having access to the core network 205 through the public domain network 250 are user terminals 242, a content cache 244 and portals 246.

In particular embodiments of the present invention, an application requesting streaming data runs in the terminal equipment component of the mobile station 220. The application communicates using the mobile station 220 with a base station transceiver system (BTS) 222 over a wireless communication link. The BTS 222 communicates with the base station system controller (BSC) 224 that communicates with the core network 205. The BSC 224 and the BTS 222 utilize one or more radio access bearers (RABs) that are established for the connection requesting the streaming data and utilize the RABs to generate radio bearers (RBs) that control the transmission of data to the mobile station 220.

Radio access bearers may be initiated by the gateway GPRS support node (GGSN) 232 towards the radio access network (RAN) 210. The characteristics of the RABs are determined by the Packet Data Protocol (PDP) Context maintained at the GGSN 232 and specify the quality of service needed from the core network 205. The PDP context is established or derived from the existing PDP context using a secondary PDP context establishment procedure. The procedure is initiated by signaling sent by the streaming signal server, such as the content server 240. This procedure may be an extension of the network initiated PDP context activation procedure. Alternatively, the procedure could be initiated by the streaming client on the mobile station 220. This latter procedure is specified in 3G.PP 26.233 in Release 4 of the specification, the disclosure of which is incorporated herein by reference as if set forth fully herein. In this architecture, the RAN 210, Core Network 205 and service networks form hierarchies of the operator's network. The streaming server, such as the content server 240 interfaces to the GGSN through the public domain network 250 using the Gi interface. In certain embodiments of the present invention, either of the options for QoS specification are not precluded and either network directed or mobile directed approaches to propagate the session quality requirements across this hierarchical structure may be utilized.

The signaling server maintains the state of the streaming connection in a manner similar to that utilized by a Call State Control Function (CSCF) used for IP telephony. However, it is independent of the IP telephony functions except when the streaming service is part of a multimedia service.

Thus, according to particular embodiments of the present invention, during session set up, the GGSN 232, in turn, causes the creation of RABs from the core network 205 toward the radio access network 210. Consequently, the various RBs correspond to the RAB or RABs created. Priority classes of the packets may be associated with the various RBs. Alternatively, separate RABs may be created for each priority class.

Data packets from the public domain network 250 are received through the media gateway 234 under the control of the media gateway control function 240 and are routed through the core network 205 to the appropriate radio network 210. Progressive encoding of the data packets may take place anywhere upstream of the communication link to the mobile station 210. For example, the data packets may be progressively coded by a server on the public domain network 250 or may be progressively encoded by the base station system controller 224. Similarly, assignment of a priority to a packet (e.g. classification as described above) may take place anywhere upstream of the wireless communication link to the mobile station 210. For example, classification could be carried out by the SGSN 230 and a priority incorporated into the protocol data units (PDUs) output by the SGSN 230 and received by the BSC 224 to provide SDUs to the BSC 224. Furthermore, the classification may be further based on the application to which the packets are destined such that the control of the discarding of packets and/or retransmission of packets is application centric. Thus, the determination of when to discard, retransmit and/or terminate retransmission of packets may be made on an application and/or mobile station 220 basis.

Figure 5:
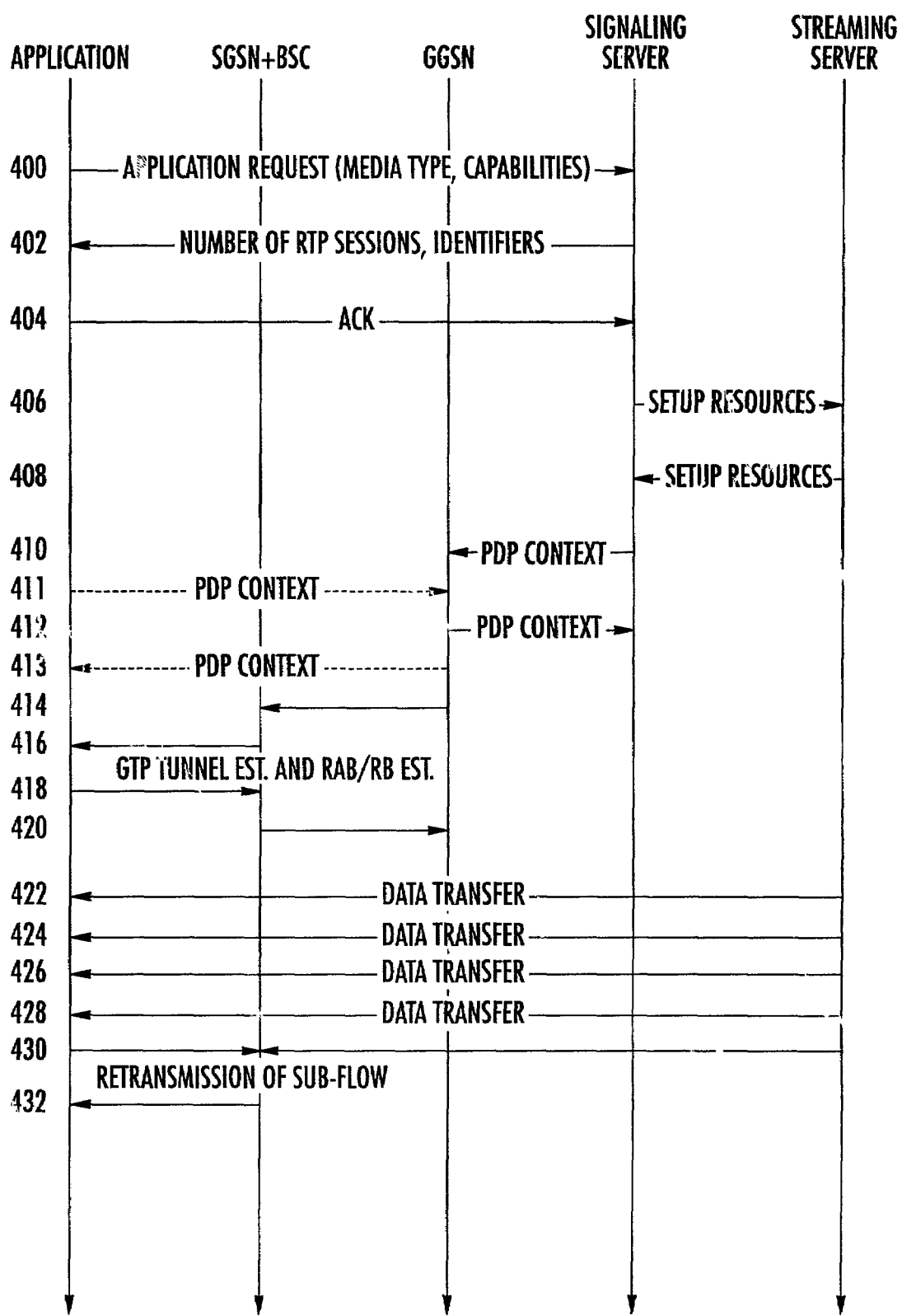
FIG. 5 is a flow diagram illustrating communication in establishing a streaming data session according to embodiments of the present invention.

FIG. 5 is an illustration of operations that may be carried out in establishing a session between an application executing at the mobile station 220 and a streaming server accessible through the public domain network 250. As seen in the flow diagram of FIG. 5, at line 400, the application requests data from a streaming server by sending the application request, which may include an identification of the media type and the capabilities of the mobile terminal 220/application, to a signaling server, such as the media gateway 234. In response to the request, the signaling server returns the number of RTP sessions and identifiers associated with those sessions to the application (line 402). The application acknowledges receipt of the RTP information (line 404) and the signaling server sets up the resources needed for the data transfer with the streaming server (lines 406 and 408). After setting up the communications with the streaming server the signaling server establishes the public domain protocol (PDP) context with the GGSN 232 (lines 410 and 412). Alternatively, as illustrated by the dotted lines 411 and 413 in FIG. 5, the PDP context may be established by the mobile client (the application). The GGSN 232, the SGSN 230 and the BSC 224 establish a GPRS tunneling protocol (GTP) tunnel and the RABs/RBs (lines 414, 416, 418 and 420). After the tunnel and RABs/RBs are established, the data is transferred from the streaming server to the application (lines 422, 424, 426, 428) utilizing the content based control as described in further detail herein. Lines 430 and 432 of FIG. 4 illustrate retransmission of data to the application by the SGSN 230 and/or BSC 224.

Figure 6:
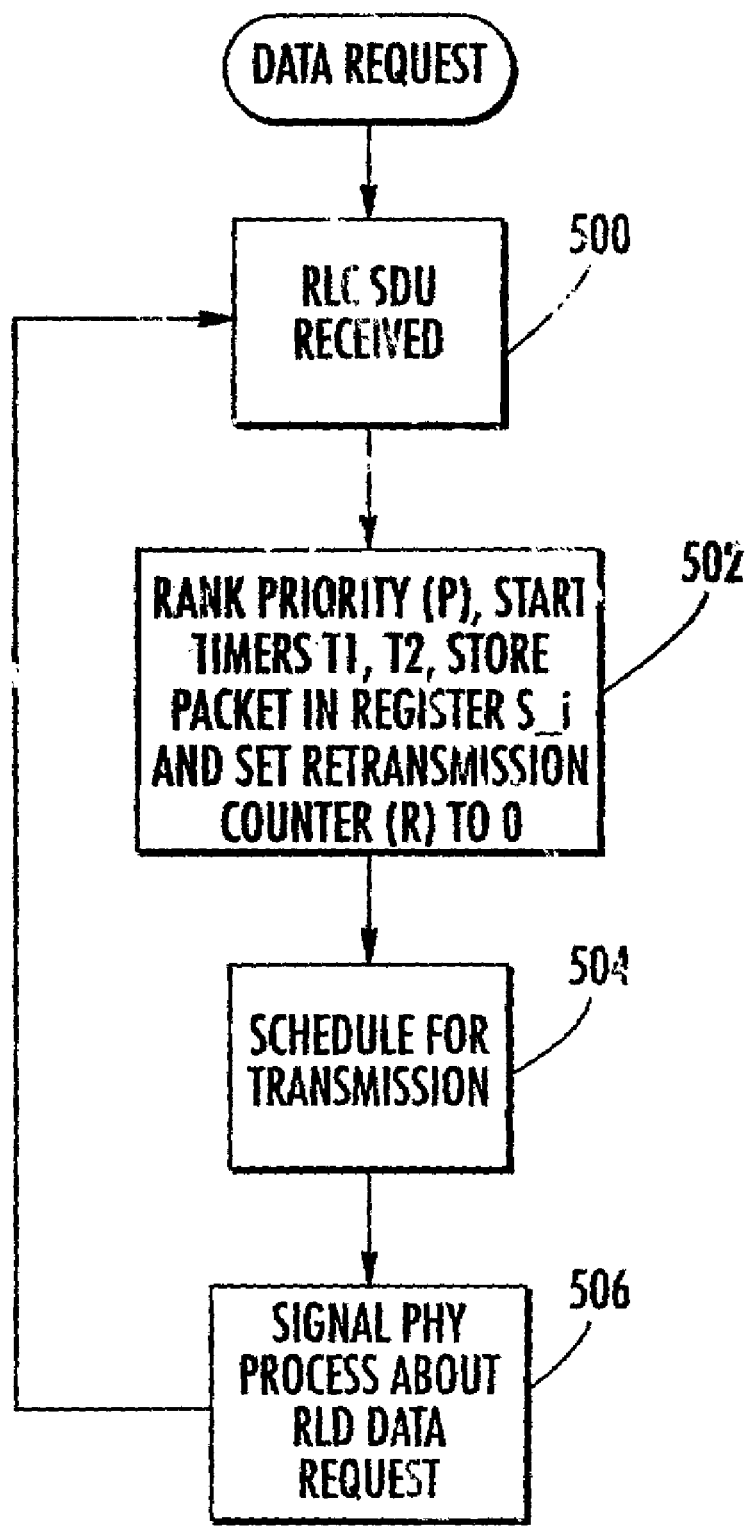
FIG. 6 is a flowchart illustrating operations according to embodiments of the present invention.
Figure 7:
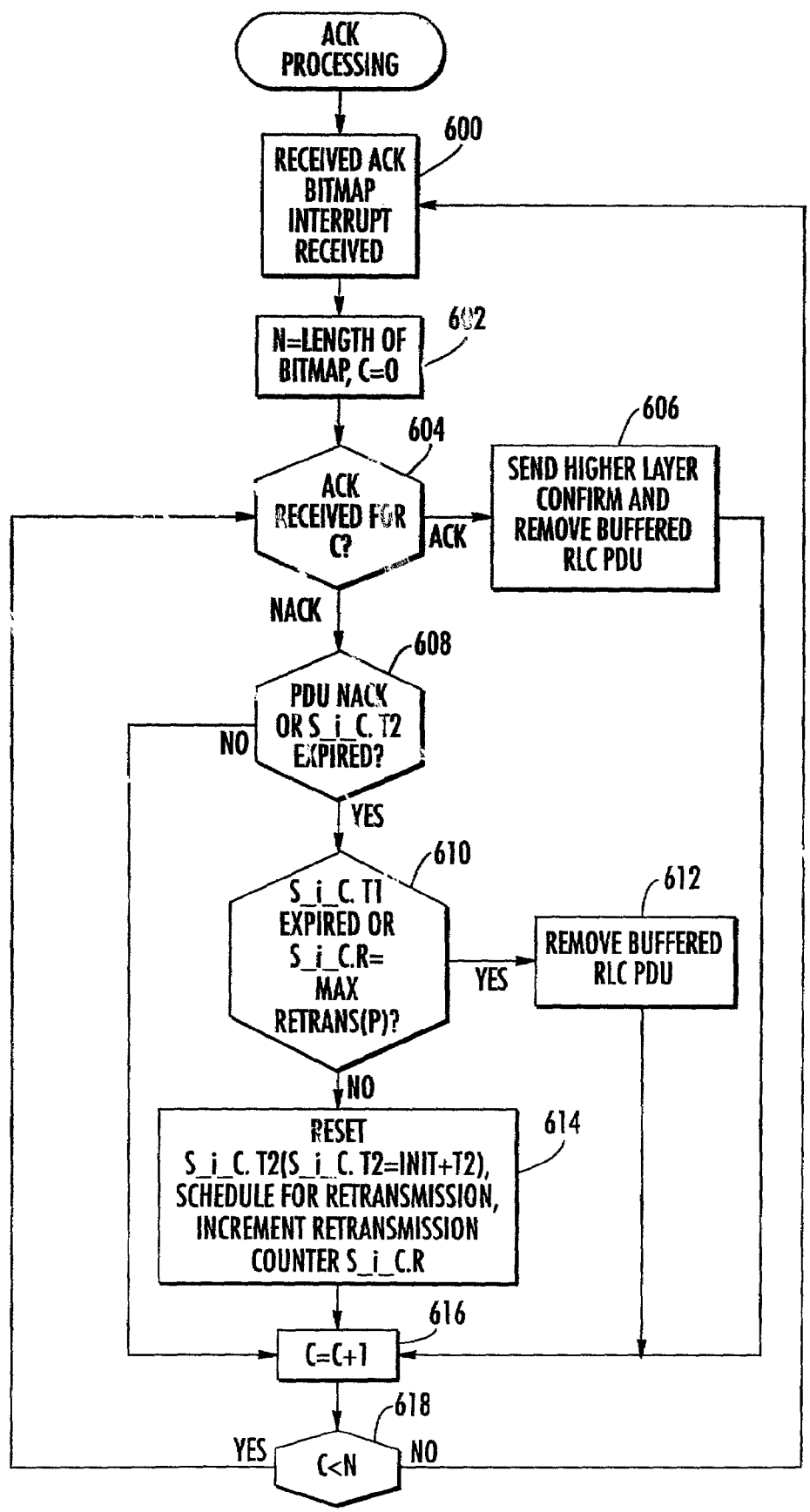
FIG. 7 is a flowchart illustrating operations according to further embodiments of the present invention.

FIGS. 6 and 7 are flowchart illustrations of operations that may be carried out by the BSC 224 and/or the BSTS 222 according to embodiments of the present invention. The operations of FIG. 5 may be, for example, implemented as a single process or part of a state machine that handles radio link control (RLC) layer SDUs. As will be appreciated by those of skill in the art in light of the present disclosure, other associated procedures may be readily discerned from knowledge of the specifications described above and need not be described further herein. In FIGS. 6 and 7, a priority P, that may be derived from the flow identifier (e.g., RB and/or RAB) and/or otherwise established based on the information content of the SDU, is attached to each data unit that is received for transmission. A timer T1 has an associated maximum time a packet can be kept alive and may be different for the different priorities P. Optionally, a timer T2 may be associated with a time within which an ACK or NACK should be received (conventional operation would wait for the ACK or NACK) and may also be different for the different priorities P.

FIG. 6 illustrates operations for classification of data packets of SDUs and scheduling of transmission of packets so as to allow for the control of discarding and/or retransmission of such data packets. As seen in FIG. 6, a radio link control (RLC) layer SDU is received (block 500), for example, by the BSTS 222. The priority of the SDU is ranked, for example, based on the flow identifier of the packet and the priority P is attached to the packet (block 502). Thus, for example, the flow identifier of an RLC SDU may be established based on the information content of the RLC SDU such that the priority P will be established based on the information content of the RLC SDU. For example, as described above, when the streaming data is encoded, the data may be assigned a flow identifier based on the coding level such that packets with a greater level of information content may be assigned different flow identifiers than packets with a lower level of information content. Similarly, packets with differing levels of information content may be provided to different protocol stacks such that the protocol stack associated with a packet indicates the level of information content of the packet.

In any event, the timer T1 is started and, if provided, the timer T2 is also started (block 502). Also, the SDU is buffered to allow retransmission by storing the packet in a register (S_i) (block 502). The retransmission count (R) is also initialized to zero for the SDU (block 502). The SDU is then scheduled for delivery (block 504). The procedure that schedules the SDU for transmission sends the data unit to the physical layer process (PHY) for timed delivery to the assigned channel as an RLC PDU (block 506). Operations then continue with proccessing of the next RLC SDU (block 500).

FIG. 7 illustrates operations for control of the discarding and retransmission of the RLC PDUs scheduled for transmission in FIG. 6. As seen in FIG. 7, an interrupt denotes the arrival of an acknowledgement bitmap from the mobile station 220 (block 600). The length of the bit map (N) is determined and an index into the bitmap (C) is initialized to zero to begin processing of the bitmap (block 602). The bitmap is evaluated to determine if the entry corresponding to the current value of C indicates that an ACK has been received for the RLC PDU corresponding to the entry in the bitmap (block 604). If an ACK has been received, the buffered RLC PDU is removed from the register (S_i) and confirmation of receipt of the RLC PDU is provided to a higher protocol layer in a protocol stack (block 606).

If the bitmap entry indicates that an ACK has not been received (block 604), the bitmap is further evaluated to determine if an NACK has been received or, if provided, the T2 timer associated with the RLC PDU has expired and an ACK has not been received (block 608). As described above, the expiration of the T2 timer may be based on the priority P associated with the corresponding RLC PDU such that, for example, higher priority RLC PDUs may wait longer for an ACK than lower priority RLC PDUs. If an NACK has not been received and the T2 timer has not expired (block 608), the index value C is incremented (block 616) and the index evaluated to determine if the end of the bitmap has been reached (block 618). If the end of the bitmap has not been reached (block 618), the next bit map entry is evaluated (block 604). If the end of the bitmap has been reached (block 618), the process then waits for the next occurrence of the bitmap interrupt (block 600).

If an NACK has been received or the T2 timer has expired (block 608), the T1 timer associated with the RLC PDU is evaluated to determine if it has expired and the number of retransmission attempts (R) associated with the RLC PDU is evaluated to determined if the maximum number of retransmission attempts associated with the priority P of the RLC PDU has been reached (block 610). As with the T2 timer, the expiration of the T1 timer may be based on the priority P associated with the corresponding RLC PDU such that, for example, higher priority RLC PDUs may have a longer lifetime than lower priority RLC PDUs. Similarly, the maximum number of retransmissions may be based on the priority P associated with the corresponding RLC PDU such that, for example, higher priority RLC PDUs may be allowed more retransmission attempts than lower priority RLC PDUs.

If the T1 timer associated with the RLC PDU has not expired and the number of retransmission (R) associated with the RLC PDU the maximum number of retransmission associated with the priority P of the RLC PDU has not been reached (block 610), the T2 timer associated with the RLC PDU is reset, the RLC PDU is scheduled for retransmission and the retransmission count R associated with the RLC PDU is incremented (block 614). The index value C is incremented (block 616) and the index evaluated to determine if the end of the bitmap has been reached (block 618). If the end of the bitmap has not been reached (block 618), the next bit map entry is evaluated (block 604). If the end of the bitmap has been reached (block 618), the process then waits for the next occurrence of the bitmap interrupt (block 600).

If the T1 timer associated with the RLC PDU has expired or the number of retransmission attempts (R) associated with the RLC PDU has reached the maximum number of retransmission attempts associated with the priority P of the RLC PDU has been reached (block 610), the buffered RLC PDU is removed from the register (S_i) (block 612). The index value C is incremented (block 616) and the index evaluated to determine if the end of the bitmap has been reached (block 618). If the end of the bitmap has not been reached (block 618), the next bit map entry is evaluated (block 604). If the end of the bitmap has been reached (block 618), the process then waits for the next occurrence of the bitmap interrupt (block 600).

As described above, the parameters for T1, T2 and/or R may be set for each priority based on predetermined criteria, such as quality of service requirements. Thus, differing media content may have different values for T1, T2 and/or R based on the characteristics of the media. For example, streaming audio may have different parameters than streaming video.

As will be appreciated by those of skill in the art in light of the present disclosure, by monitoring retransmission attempts, PDU lifetime expiration and/or maximum ACK timing, the effective performance of the communication link to a mobile terminal 220 may be monitored. For example, as packet loss increases over the communication link the number of retransmission attempts for packets transmitted over the link may increase. Furthermore, the timer values T1, T2 and/or the maximum number of retransmissions (R) per flow can be dynamically changed by another process that is monitoring the performance of the connection. Such a change may be proactive and/or reactive to changes in connection performance. Accordingly, embodiments of the present invention provide for monitoring performance of a connection both directly, for example, through signal strength measurements and the like, and indirectly, for example, through monitoring retransmission attempts.

The flowcharts, flow diagrams and block diagrams of FIGS. 1 through 7 illustrate the architecture, functionality, and operation of possible implementations of systems, methods and computer program products for providing streaming data services. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of controlling transmission of streaming data between a first data processing system and a second data processing system in a packet network, the method comprising:

assigning priorities to packets of the streaming data based on characteristics of the packets of streaming data;

monitoring performance of transmission of the packets from the first data processing system to the second data processing system;

preventing retransmission of selected ones of the packets from the first data processing system to the second data processing system based on the assigned priority of the selected ones of the packets and the monitored performance of transmission; and progressively coding the streaming data to provide packets of progressively coded streaming data;

wherein assigning priorities to packets of streaming data based on characteristics of the packets of streaming data comprises assigning priorities to the packets of progressively coded streaming data based on the progressive coding of the data associated with corresponding ones of the packets of progressively coded streaming data;

wherein monitoring performance of transmission of the packets from the first data processing system to the second data processing system comprises monitoring performance of transmission of the packets of progressively coded streaming data from the first data processing system to the second data processing system;

wherein preventing retransmission of selected ones of the packets from the first data processing system to the second data processing system based on the assigned priority of the selected ones of the packets and the monitored performance of transmission comprises preventing retransmission of selected ones of the packets of progressively coded streaming data from the first data processing system to the second data processing system based on the assigned priority of the selected ones of the packets of progressively coded streaming data and the monitored performance of transmission; and wherein progressively coding the streaming data to provide packets of progressively coded streaming data comprises progressively coding the streaming data to provide packets of progressively coded streaming data utilizing subband coding.

2. The method of claim 1, wherein assigning priorities to the packets of progressively coded streaming data based on the progressive coding of the data associated with corresponding ones of the packets of progressively coded streaming data comprises assigning priorities to the packets of progressively coded streaming data based on a subband associated with the data associated with corresponding ones of the packets of progressively coded streaming data.

3. The method of claim 1, wherein assigning priorities to packets of the streaming data based on characteristics of the packets of streaming data comprises assigning priorities to packets of the streaming data based on a protocol stack associated with ones of the packets of streaming data.

4. The method of claim 1, further comprising selectively discarding ones of packets available for transmission from the first data processing system to the second data processing system based on the priority associated with packets available for transmission and the monitored performance of transmission.

5. The method of claim 4, wherein the monitored performance of transmission comprises a transmission delay associated with the packets; and wherein selectively discarding ones of packets available for transmission from the first data processing system to the second data processing system based on the priority associated with packets available for transmission and the monitored performance of transmission comprises selectively discarding packets available for transmission from the first data processing system to the second data processing system based on the transmission delay associated with corresponding ones of the packets available for transmission and a maximum allowable transmission delay associated with the priority associated with the corresponding ones of the packets available for transmission.

6. The method of claim 1, wherein the monitored performance of transmission comprises a number of retransmission attempts associated with corresponding ones of the packets; and wherein preventing retransmission of selected ones of the packets from the first data processing system to the second data processing system based on the assigned priority of the selected ones of the packets and the monitored performance of transmission comprises:

determining if retransmission of a selected packet would exceed a maximum number of retransmission attempts associated with the priority of the selected packet; and preventing retransmission of the selected packet if retransmission of a selected packet would exceed a maximum number of retransmission attempts associated with the priority of the selected packet.

7. The method of claim 1, wherein the second data processing system comprises a mobile terminal and wherein transmission of the data packets occurs over a wireless communications media.

8. The method of claim 1, wherein the second data processing system comprises a mobile terminal, the method further comprising transmitting the data packets from a Universal Mobile Telephone System core network to a radio access network for transmission to the mobile terminal.

9. The method of claim 8, wherein the step of assigning priorities to packets of the streaming data based on characteristics of the packets of streaming data assigning priorities to packets of the streaming data based on flow identifiers associated with corresponding ones of the packets of streaming data.

10. The method of claim 9, wherein the flow identifiers are associated with corresponding radio bearers such that a priority is associated radio bearers of a radio access bearer corresponding to the streaming data.

11. The method of claim 1 wherein the packets of streaming data for transmission to the second computer are all associated with an application executing on the second computer.

12. A method of controlling transmission of streaming data between a first data processing system and a second data processing system in a packet network, the method comprising:

assigning priorities to packets of the streaming data based on characteristics of the packets of streaming data;

monitoring performance of transmission of the packets from the first data processing system to the second data processing system;

preventing retransmission of selected ones of the packets from the first data processing system to the second data processing system based on the assigned priority of the selected ones of the packets and the monitored performance of transmission; and progressively coding the streaming data to provide packets of progressively coded streaming data;

wherein assigning priorities to packets of streaming data based on characteristics of the packets of streaming data comprises assigning priorities to the packets of progressively coded streaming data based on the progressive coding of the data associated with corresponding ones of the packets of progressively coded streaming data;

wherein monitoring performance of transmission of the packets from the first data processing system to the second data processing system comprises monitoring performance of transmission of the packets of progressively coded streaming data from the first data processing system to the second data processing system;

wherein preventing retransmission of selected ones of the packets from the first data processing system to the second data processing system based on the assigned priority of the selected ones of the packets and the monitored performance of transmission comprises preventing retransmission of selected ones of the packets of progressively coded streaming data from the first data processing system to the second data processing system based on the assigned priority of the selected ones of the packets of progressively coded streaming data and the monitored performance of transmission; and wherein progressively coding the streaming data to provide packets of progressively coded streaming data comprises progressively coding the streaming data to provide packets of progressively coded streaming data utilizing wavelet transforms.

13. The method of claim 12, wherein assigning priorities to the packets of progressively coded streaming data based on the progressive coding of the data associated with corresponding ones of the packets of progressively coded streaming data comprises assigning priorities to the packets of progressively coded streaming data based on a compression level of the wavelet transform associated with the data associated with corresponding ones of the packets of progressively coded streaming data.

14. A method of controlling transmission of streaming data between a first data processing system and a second data processing system in a packet network, the method comprising:

assigning priorities to packets of the streaming data based on characteristics of the packets of streaming data;

monitoring performance of transmission of the packets from the first data processing system to the second data processing system;

preventing retransmission of selected ones of the packets from the first data processing system to the second data processing system based on the assigned priority of the selected ones of the packets and the monitored performance of transmission;

progressively coding the streaming data to provide packets of progressively coded streaming data; and negotiating between the first data processing system and the second data processing system a method of progressively coding the streaming data;

wherein assigning priorities to packets of streaming data based on characteristics of the packets of streaming data comprises assigning priorities to the packets of progressively coded streaming data based on the progressive coding of the data associated with corresponding ones of the packets of progressively coded streaming data;

wherein monitoring performance of transmission of the packets from the first data processing system to the second data processing system comprises monitoring performance of transmission of the packets of progressively coded streaming data from the first data processing system to the second data processing system;

wherein preventing retransmission of selected ones of the packets from the first data processing system to the second data processing system based on the assigned priority of the selected ones of the packets and the monitored performance of transmission comprises preventing retransmission of selected ones of the packets of progressively coded streaming data from the first data processing system to the second data processing system based on the assigned priority of the selected ones of the packets of progressively coded streaming data and the monitored performance of transmission; and wherein progressively coding the streaming data to provide packets of progressively coded streaming data comprises progressively coding the streaming data utilizing the negotiated method to provide packets of progressively coded streaming data.

15. A method of controlling the transmission of streaming data transmitted from a first data processing system to a second data processing system, comprising:

controlling the transmission of data packets of the streaming data from the first data processing system to the second data processing system based on a level of information content associated with corresponding ones of the data packets so that data packets with a higher level of information content are given priority in transmission over data packets with a lower level of information content, wherein controlling the transmission of data packets of the streaming data from the first data processing system to the second data processing system based on a level of information content associated with corresponding ones of the data packets so that data packets with a higher level of information content are given priority in transmission over data packets with a lower level of information content comprises controlling a maximum number of retransmission attempts of the data packets based on the level of information content associated with corresponding ones of the data packets.

16. The method of claim 15, wherein the maximum number of retransmission attempts is based on a quality of service associated with the transmission of data from the first data processing system to the second data processing system.

17. The method of claim 15, further comprising dynamically adjusting the maximum number of retransmission attempts associated with a priority based on a monitored performance of a communications channel between the first data processing system and the second data processing system.

18. The method of claim 15, wherein controlling the transmission of data packets of the streaming data from the first data processing system to the second data processing system based on a level of information content associated with corresponding ones of the data packets so that data packets with a higher level of information content are given priority in transmission over data packets with a lower level of information content comprises controlling a maximum lifetime of the data packets based on the level of information content associated corresponding ones of the data packets,
  wherein a maximum lifetime of a data packet comprises a duration determined by timer corresponding to a packet expiration.

19. The method of claim 18, wherein the maximum lifetime of packets associated with a priority is based on a quality of service associated with the transmission of data from the first data processing system to the second data processing system.

20. The method of claim 18, further comprising dynamically adjusting the maximum lifetime of packets associated with a priority based on a monitored performance of a communications channel between the first data processing system and the second data processing system.

21. The method of claim 15, wherein controlling the transmission of data packets of the streaming data from the first data processing system to the second data processing system based on a level of information content associated with corresponding ones of the data packets so that data packets with a higher level of information content are given priority in transmission over data packets with a lower level of information content comprises controlling a maximum amount of time in which an acknowledgement of receipt of a packet by the second data processing system may be received at the first data processing system before retransmission of the data packet is attempted based on the level of information content associated with the data packet.

22. The method of claim 21, wherein the maximum amount of time in which an acknowledgement of receipt of a packet by the second data processing system may be received at the first data processing system before retransmission of the data packet is attempted that is associated with a priority is based on a quality of service associated with the transmission of data from the first data processing system to the second data processing system.

23. The method of claim 21, further comprising dynamically adjusting the maximum amount of time in which an acknowledgement of receipt of a packet by the second data processing system may be received at the first data processing system before retransmission of the data packet is attempted that is associated with a priority based on a monitored performance of a communications channel between the first data processing system and the second data processing system.

24. The method of claim 15, further comprising:
  assigning routing transport protocol layer identifiers to the data packets based on the level of information content of the data packets; and
  wherein controlling the transmission of data packets of the streaming data from the first data processing system to the second data processing system based on a level of information content associated with corresponding ones of the data packets so that data packets with a higher level of information content are given priority in transmission over data packets with a lower level of information content comprises controlling the transmission of data packets of the streaming data from the first data processing system to the second data processing system based a flow identifier associated with corresponding ones of the data packets to as to control transmission of data packets based on a level of information content associated with corresponding ones of the data packets.

25. The method of claim 17, wherein the first data processing system transmits streaming data to a third data processing system, further comprising:
  controlling the transmission of data packets of the streaming data from the first data processing system to the third data processing system based on a level of information content associated with corresponding ones of the data packets of the streaming data transmitted from the first data processing system to the third data processing system so that data packets with a higher level of information content are given priority in transmission over data packets with a lower level of information content irrespective of the priority of data packets of the streaming data transmitted from the first data processing system to the third data processing system.

26. The method of claim 15, wherein the data is transmitted from the first data processing system to the second data processing system over a wireless communications media.

27. A system for controlling transmission of streaming data between a first data processing system and a second data processing system in a packet network, comprising:
  means for assigning priorities to packets of the streaming data based on characteristics of the packets of streaming data;
  means for monitoring performance of transmission of the packets from the first data processing system to the second data processing system;
  means for preventing retransmission of selected ones of the packets from the first data processing system to the second data processing system based on the assigned priority of the selected ones of the packets and the monitored performance of transmission; and
  means for progressively coding the streaming data to provide packets of progressively coded streaming data;
  wherein means for progressively coding,g the streaming data to provide packets of progressively coded streaming data comprise means for progressively coding the streaming data to provide packets of progressively coded streaming data utilizing wavelet transforms.

28. An apparatus for controlling transmission of streaming data between a first data processing system and a second data processing system in a packet network, comprising:
  a priority assignment circuit that assigns priorities to packets of the streaming data based on characteristics of the packets of streaming data;
  a performance monitoring circuit that monitors performance of transmission of the packets from the first data processing system to the second data processing system;
  a retransmission prevention circuit that prevents retransmission of selected ones of the packets from the first data processing system to the second data processing system based on the assigned priority of the selected ones of the packets and the monitored performance of transmission; and
  a progressive coding circuit that encodes the streaming data to provide packets of progressively coded streaming data;
  wherein the progressive coding circuit is configured to provide packets of progressively coded streaming data utilizing subband coding.

29. The apparatus of claim 28, wherein the priority assignment circuit, the performance monitoring circuit and the retransmission prevention circuit are incorporated in a base station system controller.

30. The apparatus of claim 28, wherein the priority assignment circuit, the performance monitoring circuit and the retransmission prevention circuit are incorporated in an ASIC.

31. The apparatus of claim 28, wherein the priority assignment circuit, the performance monitoring circuit and the retransmission prevention circuit are incorporated in a base station transceiver.

32. An apparatus for controlling the transmission of streaming data, comprising:
 a streaming data receiver circuit that receives streaming data transmitted from a first data processing system to a second data processing system; and
 a transmission control circuit that controls the transmission of data packets of the received streaming data to the second data processing system based on a level of information content associated with corresponding ones of the data packets so that data packets with a higher level of information content are given priority in transmission over data packets with a lower level of information content;
 wherein the transmission control circuit controls the transmission of data packets of the streaming data from the first data processing system to the second data processing system based on a level of information content associated with corresponding ones of the data packets so that data packets with a higher level of information content are given priority in transmission over data packets with a lower level of information content comprises controlling a maximum number of retransmission attempts of the data packets based on the level of information content associated with corresponding ones of the data packets.

33. The apparatus of claim 32, wherein the streaming data receiver circuit and the transmission control circuit are incorporated in a base station system controller.

34. The apparatus of claim 32, wherein the streaming data receiver circuit and the transmission control circuit are incorporated in a base station transceiver.

35. The apparatus of claim 32, wherein the streaming data receiver circuit and the transmission control circuit are incorporated in an ASIC.

36. A computer program product for controlling transmission of streaming data between a first data processing system and a second data processing system in a packet network, comprising:
 a computer readable medium having computer readable program code embodied therein, the computer readable program code comprising:
 a first computer readable program code configured to assign priorities to packets of the streaming data based on characteristics of the packets of streaming data;
 a second computer readable program code configured to monitor performance of transmission of the packets from the first data processing system to the second data processing system;
 a third computer readable program code configured to prevent retransmission of selected ones of the packets from the first data processing system to the second data processing system based on the assigned priority of the selected ones of the packets and the monitored performance of transmission; and
 a fourth computer readable program code configured to progressively code the streaming data to provide packets of progressively coded streaming data utilizing wavelet transforms.

37. A computer program product for controlling the transmission of streaming data, comprising:
 a computer readable medium having computer readable program code embodied therein, the computer readable program code comprising:
 a first computer readable program code configured to control the transmission of data packets of the streaming data from the first data processing system to the second data processing system based on a level of information content associated with corresponding ones of the data packets so that data packets with a higher level of information content are given priority in transmission over data packets with a lower level of information content; and
 wherein the first computer readable program code is further configured to control a maximum number of retransmission attempts of the data packets based on the level of information content associated with corresponding ones of the data packets.

38. A computer program product according to claim 37, wherein the first computer readable program code configured to control the transmission of data packets comprises computer readable program code configured to control the retransmission of data packets of the streaming data from the first data processing system to the second data processing system based on a level of information content associated with corresponding ones of the data packets so that data packets with a higher level of information content are given priority in retransmission over data packets with a lower level of information content.

39. A computer program product for controlling transmission of streaming data between a first data processing system and a second data processing system in a packet network, comprising:
 a computer readable medium having computer readable program code embodied therein, the computer readable program code comprising:
 a first computer readable program code configured to assign priorities to packets of the streaming data based on characteristics of the packets of streaming data;
 a second computer readable program code configured to monitor performance of transmission of the packets from the first data processing system to the second data processing system;
 a third computer readable program code configured to prevent retransmission of selected ones of the packets from the first data processing system to the second data processing system based on the assigned priority of the selected ones of the packets and the monitored performance of transmission; and
 a fourth computer readable program code configured to progressively code the streaming data to provide packets of progressively coded streaming data utilizing subband coding.

* * * * *

UNITED STATES PATENT AND TRADEMARK OFFICE
CERTIFICATE OF CORRECTION

| | | |
|---|---|---|
| PATENT NO. | : 7,194,000 B2 | Page 1 of 1 |
| APPLICATION NO. | : 10/177205 | |
| DATED | : March 20, 2007 | |
| INVENTOR(S) | : Balachandran et al. | |

It is certified that error appears in the above-identified patent and that said Letters Patent is hereby corrected as shown below:

In Column 1, Line 13, delete "Vow" and insert -- VoIP --, therefor.

In Column 1, Line 21, delete "modem" and insert -- modern --, therefor.

In Column 16, Line 6, in Claim 25, delete "claim 17" and insert -- claim 15 --, therefor.

In Column 16, Line 41, in Claim 27, delete "coding,g" and insert -- coding --, therefor.

Signed and Sealed this

Twenty-fifth Day of March, 2008

JON W. DUDAS
*Director of the United States Patent and Trademark Office*